No. 807,363. PATENTED DEC. 12, 1905.
J. M. DODGE.
SPROCKET WHEEL.
APPLICATION FILED JUNE 1, 1904.
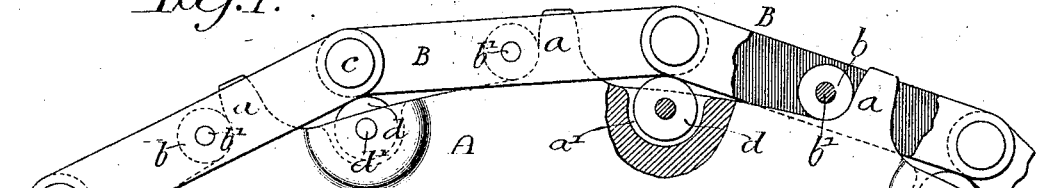
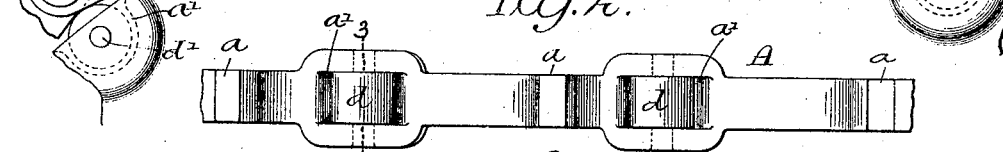
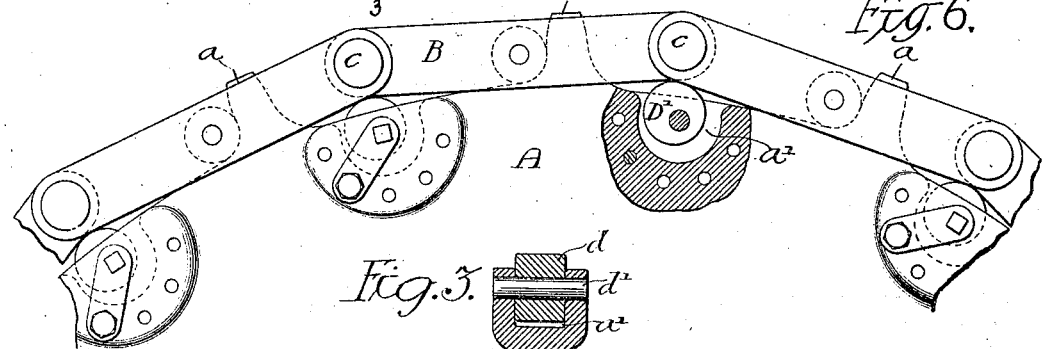
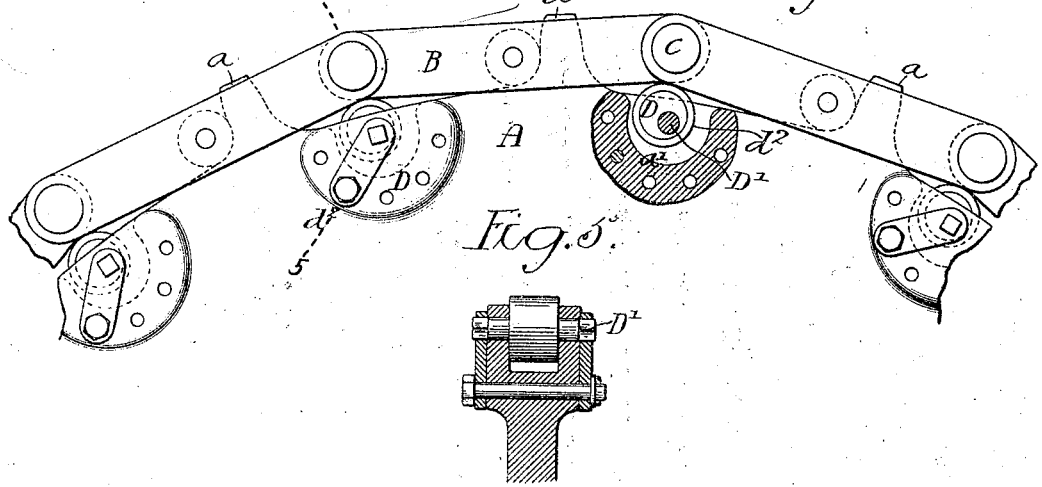
Witnesses:
Hamilton D. Turner
Frank L. A. Graham
Inventor:
James M. Dodge,
by his Attorneys,
Howson & Howson

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

SPROCKET-WHEEL.

No. 807,363.　　　　Specification of Letters Patent.　　　　Patented Dec. 12, 1905.

Application filed June 1, 1904. Serial No. 210,666.

*To all whom it may concern:*

Be it known that I, JAMES M. DODGE, a citizen of the United States, residing in Philadelphia, Pennsylvania, have invented certain Improvements in Sprocket-Wheels, of which the following is a specification.

The main object of my invention is to provide a sprocket-wheel with an antifriction-bearing at the point where the ends of the links of the chain bear upon the wheel.

A further object of the invention is to provide means for adjusting this bearing-point so as to keep the pitch-line of the chain the same.

My invention is especially applicable to sprocket-wheels in which the teeth engage the links of a chain midway between the pivots thereof.

In the accompanying drawings, Figure 1 is a side view, partly in section, of sufficient of a sprocket-wheel to illustrate my invention, showing the chain in position. Fig. 2 is a plan view of the wheel. Fig. 3 is a sectional view on the line 3 3, Fig. 2. Fig. 4 is a view of a sprocket-wheel having a roller and means for adjusting the same. Fig. 5 is a sectional view on the line 5 5, Fig. 4; and Fig. 6 is a view showing the adjusting means, the roller being omitted.

A is a sprocket-wheel having teeth $a$, which contact with the wheels $b$ of the chain B. These wheels $b$ are mounted on pins $b'$, extending from one element of the link of the chain to the other, as clearly shown in Fig. 1. The links of the chain articulate upon pins $c$, and the wheels $b$, in the present instance, are mounted on the links midway between the pivots. In order to provide a bearing with the least friction possible for the links at the pivot-point, I mount in recesses $a'$ of the sprocket-wheel rollers $d$, carried by spindles $d'$, and these rollers are so situated that the ends of the links will rest upon them, thus keeping the chain in perfect alinement. In some instances the rollers may be formed as shown in Figs. 4 and 5, which illustrate the rollers $d^2$ mounted on eccentrics D, carried by shafts D', which can be turned and locked in any position desired. By this means the chain can be kept at the proper pitch-line. In some instances, as shown in Fig. 6, the rollers may be dispensed with and the eccentrics D' used to support the chain at the proper point.

I claim as my invention—

1. The combination of a chain consisting of a series of links connected together by pivot-pins, with a sprocket-wheel having teeth arranged to engage the chain and having rollers mounted between the teeth and so situated that they will bear upon the chain in line with the pivots, substantially as and for the purpose set forth.

2. The combination of a chain made up of a series of links, a roller mounted on each link midway between the ends thereof, with a sprocket-wheel having teeth arranged to engage the rollers of the chain, and having rollers for supporting the chain at the pivot-points, substantially as and for the purpose set forth.

3. A sprocket-wheel having teeth, and rollers mounted on the sprocket-wheel between the teeth, and means for adjusting the rollers, substantially as described.

4. The combination of a sprocket-wheel having teeth, rollers mounted between the teeth and eccentrics upon which the rollers are mounted, said eccentrics being adjustable, substantially as described.

5. The combination of a sprocket-wheel having teeth, with eccentrics mounted between the teeth acting as supports for a chain, means for adjusting the eccentrics and locking them in the adjusted position.

In testimony whereof I have signed my name to this specification in the presence of two subscribing witnesses.

JAMES M. DODGE.

Witnesses:
　WILL. A. BARR,
　JOS. H. KLEIN.